United States Patent [19]

Shorr

[11] 4,276,176
[45] Jun. 30, 1981

[54] WATER PURIFICATION SYSTEM

[75] Inventor: Jacob Shorr, Lexington, Mass.

[73] Assignee: Systems Engineering & Manufacturing Corp., Stoughton, Mass.

[21] Appl. No.: 49,926

[22] Filed: Jun. 19, 1979

Related U.S. Application Data

[63] Continuation of Ser. No. 703,626, Jul. 8, 1976, abandoned, which is a continuation-in-part of Ser. No. 610,688, Sep. 5, 1975, Pat. No. 4,014,787, which is a continuation-in-part of Ser. No. 429,510, Feb. 2, 1974, abandoned.

[51] Int. Cl.³ .................. B01D 13/00; B01D 31/00
[52] U.S. Cl. .................................. 210/637; 210/138; 210/639; 210/651; 210/195.3; 210/433.2
[58] Field of Search .................. 210/259, 71, 321 R, 210/433 M, 23 R, 23 F, 23 H

[56] References Cited

U.S. PATENT DOCUMENTS

| | | |
|---|---|---|
| 3,648,754 | 3/1972 | Sephton .................... 210/321 R |
| 3,677,405 | 7/1972 | Keith, Jr. .................... 210/71 |
| 3,839,206 | 10/1974 | Welch .................... 210/259 |
| 3,856,569 | 12/1974 | Strong .................... 210/23 F |
| 3,880,755 | 4/1975 | Thomas et al. .................... 210/91 |
| 4,014,787 | 3/1977 | Shorr .................... 210/23 F |
| 4,073,730 | 2/1978 | Shorr et al. .................... 210/450 X |

Primary Examiner—Frank A. Spear, Jr.
Attorney, Agent, or Firm—Wolf, Greenfield & Sacks

[57] ABSTRACT

A low pressure, high flux water purification system. In a continuous loop recirculation system metal hydroxides are employed to bind impurities in wastewater into particles of a size greater than ten angstroms which are then separated from the water by means of an ultrafiltration membrane. A large metal hydroxide/impurity ratio is maintained thereby permitting a purified water flux of over 30 gfd using filter tubes of diameter greater than 100 mils and length greater than 6 inches under a wastewater pressure as low as 9 psig. The filter tubes are grouped in bundles, each bundle within its own water collecting box, so that system down time is minimized and purification standards may be maintained in the event of a partial failure of the system.

11 Claims, 6 Drawing Figures

WATER PURIFICATION SYSTEM

RELATED APPLICATIONS

This application is a continuation of Ser. No. 703,626 filed July 8, 1976 now abandoned which is a continuation-in-part of application Ser. No. 610,688 filed Sept. 5, 1975, issued Mar. 29, 1977 as U.S. Pat. No. 4,014,787 which is a continuation-in-part of application Ser. No. 429,510 filed Jan. 2, 1974 and now abandoned.

BACKGROUND OF THE INVENTION

The invention in general relates to the purification of wastewater by ultrafiltration and in particular concerns a novel system that permits a large flux of purified water per unit area of membrane, while operating with low pressures and employing filter tubes of relatively large diameter and length. The system also permits continued operation in the event of failure of individual elements of the system and/or while the system is being repaired, and consequently water purification standards may be maintained without interruption over indefinitely long periods of time.

Recently state and federal wastewater discharge regulations and a new awareness of the need for maintaining an unpolluted environment has increased the importance of removing the impurities from wastewater. In addition, the rising price of raw materials has in some cases, made practical the removing of these materials from wastewater and recycling them. These incentives toward improved water purification systems have been particularly cogent in the metal plating and finishing industries because of the high toxicity of heavy metals and heavy metal compounds as well as the relatively high commercial value of these materials. Thus a system that is particularly efficient and effective in removing metal impurities from wastewater has been actively sought by many researchers.

Many methods of water purification have been devised. One method commonly used in purifying wastewater from metal plating and finishing operations is to treat the wastewater with chemicals so that insoluble compounds containing the metal impurities are formed and precipitated. The precipitate is then separated from the water by a variety of means. A major disadvantage of this method is that some heavy metal ions and other contaminants found in wastewater from metal finishing and plating operations are soluble to some extent even in their altered chemical forms, so wastewater treated in this manner often still contains undesirably high levels of impurities. Another more recent method of treating wastewater from metal finishing and plating operations is the ion exchange method. This method has the disadvantage that it is complex and expensive.

Another method suggested for purifying wastewater from a large variety of sources, is to treat the waste with a metal salt such as ferric sulfate, ferrous sulfate, or aluminum sulfate which, if the pH of the water is suitably adjusted, is thought to form a metallic hydroxide which is very effective in binding impurities into particles of a size that can be more easily precipitated, filtered, or otherwise separated from the water. This method has been tried in combination with separating out the resulting precipitate as in conventional water purification systems conbining settling, filtering and chemical treatment, (see U.S. Pat. No. 3,677,405) this method arguably might be suggested for use in the relatively new membrane filtration process with or without settling and chemical treatment (see for example A. S. Michaels, New Separation Technique for the CPI, *Chemical Engineering Progress,* December 1968 pp. 31–43). However, it is known that metal hydroxides as conventionally used tend to clog ultrafiltration membranes. Thus prior workers have suggested avoidance of iron hydroxide in ultrafiltration systems.

When metal hydroxides were used previously, the amounts used tended to form gelatinous precipitates. It previously was thought that increasing the concentration of metal hydroxide beyond the point at which substantially all the impurities were bound, would not only be a needless waste of the salt which formed the hydroxide, but it would also serve to increase problems associated with filtering increased amounts of the precipitate created by the addition of the salts. The problems created by this pricipitate were thought to impose critical limitations on conventional water purification methods.

It was generally thought that the metal salts combined with water to form a flocculent or gelatinous (as opposed to crystalline) precipitate. This was in fact the very property of the metal salt on which the water purification methods using such a salt were based; that is, the same properties of the metal salt that enabled it to bind a wide variety of impurities, i.e. the strong van der Waals forces, hydrogen bonds, and zeta potentials, also caused it to form a gelatinous precipitate. In one known water purification method the gelatinous precipitate is allowed to settle in a settling zone. A small amount of the precipitate is allowed to enter the subsequent filter beds in these systems because it creates a gelatinous film over the filter which aids in removing suspended matter and bacteria. However, adding metal salts in excess of the amount required to bind substantially all the impurities is contraindicated in the conventional process not only because of the cost of the material, but because additional metal salts only increase the amount of precipitated sludge which must be disposed of, or if the precipitate is allowed to accumulate in the filter bed it will only advance the time at which the filter bed must be removed from service to be rehabilitated.

Membrane filtration is usually considered to be divided into two different processes which create different problems; i.e., the filtration of microsolutes (particles less than ten angstroms), called reverse osmosis, and the filtration of macrosolutes and suspended particles of a size larger than ten angstroms, called ultrafiltration. Both these processes are limited by a phenomenom known as concentration polarization—the buildup of concentration of the solute or suspended matter near the membrane wall as compared to the concentration in the solute stream. Also the precise limitations of both processes depend on whether the fluid being filtered is in turbulent or laminar flow. The present invention relates to the process called ultrafiltration.

It is an important object of this invention to provide a water purification system that utilizes metal hydroxide to bind impurities but does not require settling, prefiltering, or centrifuging prior to the ultrafiltration process.

It is another object of this invention to achieve the preceding object in a water purification system that provides flux rates through the ultrafiltration membrane higher than 30 gfd in a low pressure turbulent flow system.

It is a further object of this invention to achieve one or more of the preceding objects in a water purification system that employs ultrafiltration tube runs no longer than about 12 feet at tube diameters of from ½ to 2 inches.

It is another object of this invention to achieve one or more of the preceding objects in a water purification system that can filter commercially large quantities of wastewater but need not be designed to close tolerances.

It is a further object of this invention to achieve one or more of the preceding objects in a water purification system that can filter large quantities of wastewater but is relatively inexpensive to build.

In addition to the requirement of being able to efficiently process large quantities of water, a commercial system must meet a number of other criteria. A shutdown of a water purification system would present the user with the dilemma of either breaking the law by emitting water waste in excess of federal and state standards, or shutting down the manufacturing operations that produce the waste. Therefore, it is essential that any water purification system be capable of operation without interruption for a long period. Since any system will require some repairs and maintenance it is highly desirable that the system be designed so that repairs and maintenance can be performed without shutting down the complete system.

An ultrafiltration purification system presents some additional design problems. If the ultrafiltration membranes are allowed to dry out they irreversibly consolidate and lose their permeability. Thus they must be maintained in a wet state at all times. Also ultrafiltration membranes are extremely thin and large membrane areas must be maintained for any commercial scale operation. Therefore the probability of a leak developing somewhere in a large commercial system must be significant. Thus for the system to be reliable it is essential that any given area of the ultrafiltration membrane can be isolated without shutting down the remainder of the system. In addition, a relatively small leak for a short period can contaminate the filtered water with impurities in excess of legal limits. Thus it is essential that a leak anywhere in the system can be quickly detected and its location pinpointed. Furthermore, it would be preferable that the filtered water from a given small filter area be capable of being isolated from the filter water as a whole; otherwise a small leak would lead to the necessity of re-filtering a very large quantity of water.

Accordingly, it is a further object of this invention to achieve one or more of the objects listed above in a water purification system that is very reliable.

It is another object of this invention to achieve the preceding object in an ultrafiltration water purification system in which the filter membranes can be maintained in a wet condition at all times.

It is another object of this invention to achieve one or more of the preceding objects in a water purification system in which only a part of the filtered water will be contaminated by a leak in any given area of the filter.

It is yet another object of this invention to achieve one or more of the preceding objects in a water purification system in which leaks or other defects can be quickly detected, isolated, and repaired without shutting down the whole system.

It is still another object of this invention to provide a filter tube structure which provides for maximized filtering in a turbulent flow system with maximized exposure of flow to a membrane surface.

SUMMARY OF THE INVENTION

A water purification system has a combining agent which is preferably an inorganic metal hydroxide with the metal being selected from the group consisting essentially of iron, aluminum, tin, copper, zinc, cadmium, nickel, cobalt, silicon, lead, barium, calcium, manganese, and chrome, and means for combining at least 1700 ppm (parts per million) of the combining agent with wastewater at a pH of from 7.1 to 14 with the molar ratio of the combining agent to the impurities in the wastewater being 1:1 or greater, so that a particle-water blend is formed wherein the impurities are bound with the combining agent in particles of size at least 10 angstroms. An ultrafiltration unit is provided for separating the particle-water blend into substantially pure water and a concentrate (slurry) of the particles. The unit has at least one porous filter tube lined with a skinned ultrafiltration membrane with a length of preferably from 4 to 8 feet and a diameter of at least ½ inch, so that if the water-particle blend is incident upon the membrane under a pressure of 9 psig or higher there is a flux of purified water through the membrane of at least 30 gfd. There are means for transferring the particle-water blend from the means for combining to the ultrafiltration unit, and preferably there are means for withdrawing the concentrate of particles from the system and means for disposal of the purified water.

Preferably the fluid flow adjacent to the membrane is turbulent, the pressure is between 9 and 150 psig, and the ultrafiltration unit comprises a plurality of tube bundles each including at least one of the filter tubes and each enclosed in its own water box for collecting the purified water. Preferably the impurities are heavy metal ions and other contaminants present in wastewater derived from metal finishing and plating operations. The means for combining comprises a reacting tank, a means for introducing the combining agent, and a means for mixing the combining agent with the wastewater. The means for disposal preferably comprises means for recycling the purified water to the metal finishing and plating operations and means for passing the wastewater from those operations to the reacting tank so that the water continuously circulates through the operations and the purification system in a closed loop. Preferably there is a recirculation tank for receiving the particle concentrate and conduits for recirculating the particle concentrate between the recirculation tank and the filtration unit, and the water boxes are disposed above the recirculation tank so that in the event of contamination of the purified water collected in any of the boxes the contaminated water may be flushed into the recirculation tank. Preferably there is an automatic timing means which activates the system for brief periods of time at scheduled intervals during periods in which it is not in continuous use, thereby maintaining the skinned membranes in a wet condition. Alternatively there are means for blocking fluid from flowing through the central portion of the filter tubes. Preferably a rod centered on the axis of the filter tube extends along the length of the tube, so that the flow of the particle-water blend is confined to the annular region immediately adjacent to the inner circumference of the filter tubes. This flow is preferably turbulent flow. This expedient enables high flow, i.e., maximized velocity with maximized exposure to the filter membrane.

BRIEF DESCRIPTION OF THE DRAWINGS

Numerous other features, objects, and advantages of the invention will become apparent from the following detailed description when read in conjunction with the accompanying drawing in which.

DETAILED DESCRIPTION OF THE PREFERRED EMBODIMENT

Figure 1:
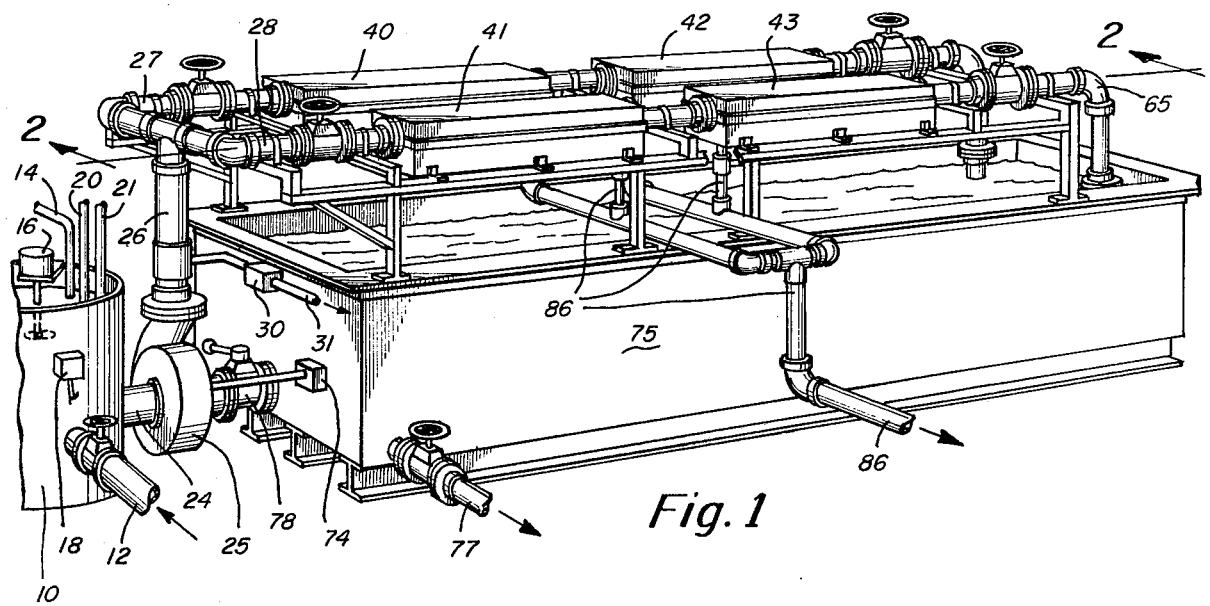
FIG. 1 is a pictorial illustration of the preferred embodiment of the invention having 4 water boxes.

With reference now to the drawings and more particularly FIG. 1 thereof, there is shown a pictorial illustration of the invention having four water boxes. Wastewater from a manufacturing or other process is combined with a binding agent in reacting tank 10 and is filtered in boxes 40, 41, 42, and 43 producing a concentrated sludge which is removed from the system through conduits 30 or 77. Substantially pure water exits through conduit 86.

The embodiment of the invention shown in the drawing is employed in the purification of wastewater derived from metal finishing and plating operations. Wastewater containing impurities such as heavy metal ions enter reacting tank 10 through conduit 12. A combining agent is added through conduit 14 and is mixed into the wastewater with the aid of stirrer 16. The combining agent is preferably a metal in its hydroxide form although it may be in its oxide form. The preferred combining agents are the inorganic hydroxides or oxides of iron and aluminum however any other inorganic oxides and hydroxides which create agglomerates large enough to be filtered and which are highly absorbtive and/or adsorbtive of heavy metal ions and other contaminants in wastewater due to electrical potential on their surface, zeta potential, hydrogen bonds, van der Waals bonds and other forces can also be used, and include oxides and hydroxides of tin, copper, zinc, cadmium, nickel, cobalt, silicon, lead, barimum, calcimum, manganese, and chrome. When inorganic metal hydroxide or oxides are used as a combining agent, they can be added directly to the wasterwater to be treated, however it is preferred to form them in the wastewater as by the addition of inexpensive inorganic metal salts. For example, chlorides, fluorides, sulfates, nitrates, and the like of any one or more of the above metals can be added to the wastewater. Sulfates such as ferrous sulfate, ferric sulfate, and aluminum sulfate are preferred due to ready availability and low cost. When any of the inorganic metal salts are used to form the combining agent they can be added directly to the wastewater as powders, but are preferably added in aqueous solution form.

The feed of the combining agent is controlled so that its concentration in the wastewater will be at least 1700 ppm (parts per million) and preferably at least 2000 ppm, and the molar ratio of the combining agent to the impurities in the wastewater is 1:1 or greater, and preferably in the range 1:1 to 10:1. Such large excesses of the combining agent are preferred because they have been found to substantially increase the flux of purified water through the ultrafiltration membranes. There is no top limit to the concentration of the combining agent used except that the solution or suspension must remain capable of being pumped in ordinary commercial equipment. Likewise there is no top limit to the molar ratio of combining agent to impurity, however, in most cases, molar ratios of 1:1 are sufficient to permit removal of the heavy metal ions and other contaminants present in wastewater derived from metal plating and finishing operations and molar ratios above 10:1 are unnecessary although no detrimental effects are encountered by higher molar ratios. In the preferred system the amount of metal hydroxide to be added is determined by monitoring the wastewater during conventional pre-treatment stages prior to its entering conduit 12.

Sensor 18 monitors the pH of the contents of reacting tank 10, and acidic material may be added through conduit 20 or alkaline material through conduit 21 to maintain the pH at a predetermined level which is between pH 7.1 and pH 14 (to allow the formation of hydroxide), and preferably between pH 8 to pH 12. However when high pH's are used the filtered water may have to be treated with acidic material to lower the pH to levels required for discharge to the environment. Excellent separation and filtration can be obtained with pH's between 9 to 10. The pH adjustment may be made before, after, or simultaneously with the addition of the combining agent. In some cases no pH adjustment is necessary as when the wastewater to be treated is at a preferred pH value.

The impurities in the wastewater combine with the preferred metal hydroxide combining agent to form particles of size at least 10 angstroms, although normally the particle size is increased from 10 to 1000 angstroms. The minimum particle size is determined by the fact that the material so increased in size will not pass through a filter having pore sizes below 10 angstroms or below any specific particle size to which the contaminants are increased. The particles may be either in solution or suspended in the water or both; thus we shall hereinafter refer to this solution and/or suspension as a water-particle blend.

The water-particle blend exits reacting tank 10 through conduit 24 and pump 25 drives it through conduits 26, 27, and 28 and thence through filter tubes 32, (FIGS. 2 and 3) arranged in tube bundles 35, 36, 37, and 38 enclosed in water boxes 40, 41, 42, and 43, respectively. Brackets 47 aid in supporting filter tubes 32.

Figure 4:
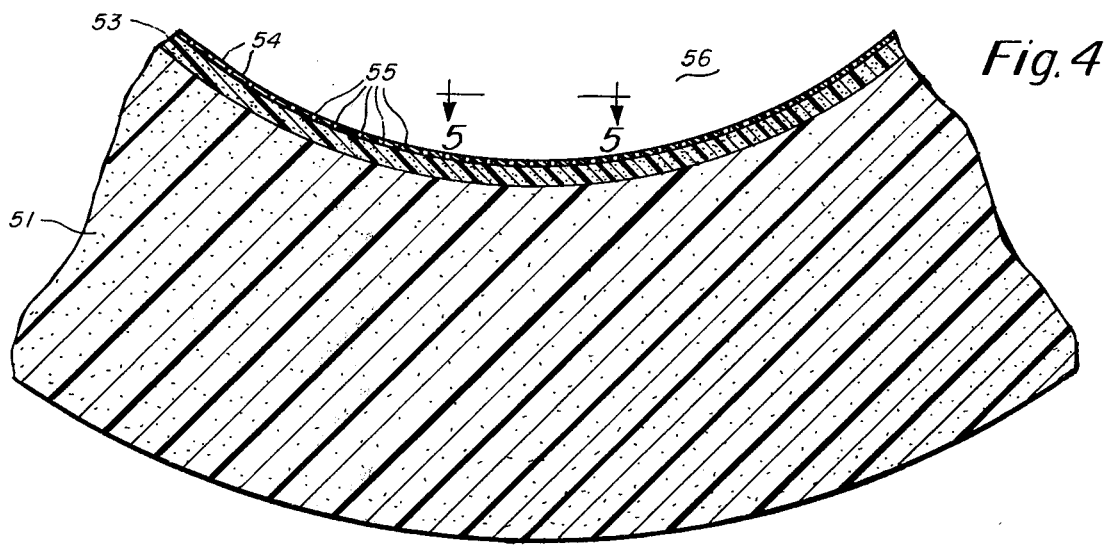
FIG. 4 is a greatly enlarged cross-sectional illustration of a portion of a filter tube.
Figure 5:
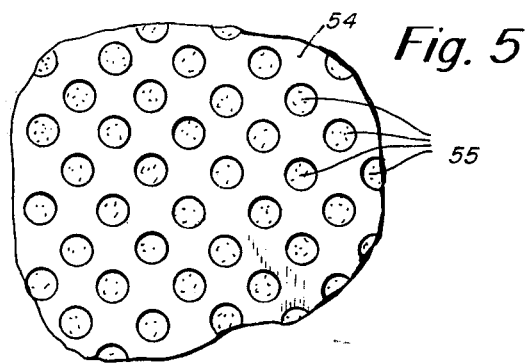
FIG. 5 is an even further enlarged illustration of a section of the surface of the ultrafiltration filter taken through line 5—5 of FIG. 4.

An enlarged cross-sectional illustration of a secton of an ultrafiltration tube as used in the preferred embodiment of the invention is shown in FIG. 4. Tube body 51 is composed of porous plastic foam or other porous material, the inner surface of which is covered with a conventional ultrafiltration membrane. The ultrafiltration membrane comprises a layer of open called porous sponge 53 and an extremely thin porous skin 54 having extremely fine pores 55 preferably of a size approximately 10 angstroms in diameter. Any conventional ultrafiltration membrane may be used, however it has been found that anisotropic or skinned membranes give the best results. Pores 55 in the porous skin are much smaller than the pores in sponge 53 and tube body 51, thus the filtration is carried out on the top surface of skin 54 and entrapment of particles in sponge 53 or tube body 51 is prevented. In an ideal system as the particle-water blend passes through the tube under pressure, the water is forced out through the ultrafiltration membrane and porous tube walls, however all particles larger than about 10 angstroms cannot pass through pores 55 and thus are carried axially along by the flow of the particle-water blend in tube bore 56. However, in practice flow of substantially pure water through the wall of the tube creates a particle flow in the direction of the tube wall and a gradual buildup or polarization of particles along the tube wall. The higher the flux of water through the tube wall the greater is the buildup of particles. This buildup of particles along the tube wall creates a large increase in the resistance to the flow of water out the pores and thus in the conventional ultrafiltration system one is forced to settle for either very low flows through the membrane or very large prohibitively expensive pumping systems. If the substance being filtered is a material that tends to form a gelatinous precipitate, then it is to be expected that the blockage of the flow through the filter would be much greater.

Surprisingly it has now been found that the addition of the large excess of the binding agent creates an increase in flow through the ultrafiltration membrane. It is thought that this result is obtained because large excesses of the binding agent such as the preferred metallic hydroxides, leads to the formation of crystalline rather than gelatinous structures. Thus with the large excess of binding agent the effects of the polarization are lessened, and large commercially useful rates of flow through the ultrafiltration membrane are possible at relatively low water pressures, which results in efficient separation of water and particles in tubes 32, with the water passing into water boxes 40, 41, 42, and 43 and the particle concentrate exiting into conduit 65.

In the preferred embodiment the particle concentrate (slurry) is discharged into recirculation tank 75 and recirculates in a closed loop through conduit 78, pump 25, conduit 26, and thence back through the filter tubes and returning to tank 75.

When the particle concentration in recirculation tank 75 reaches a concentration of preferably 5 to 20 percent solids the concentrate, now sludge, may be withdrawn through conduit 77. The slidge may then be dried and disposed of by burial, chemically treated to separate recyclable materials, or otherwise disposed of by any other suitable means. Alternatively motorized valve 30 may open permitting the sludge under pressure in conduit 26 to exit via conduit 31. Valve 30 may be activated by a timer and opened periodically or it may be activated by a sensing mechanism in either the conduits, recirculation tank 75, or in the sludge disposal unit into which conduit 31 discharges, or it may open to allow continuous discharge of the sludge while the water purification system is running. The specific dynamics and/or chemistry of the sludge disposal method determines the specific mode of withdrawal of the sludge. This system however permits great flexibility in choice of ultimate disposal methods.

Purified water 80 exits from water boxes 40, 41, 42, and 43 through conduits 86. If a highly alkaline pH has been used in the purification process the water may be neutralized with an acidic material before disposal. The water may be recirculated back to the manufacturing process which created the wastewater originally, or it may be released to the environment. When a closed continuous cycle is used, a conventional polishing step can be incorporated into the cycle.

A feature of the invention is that the filtered water is substantially pure. By substantially pure it is meant that the water contains impurities below the level set by federal regulations for water that is to be released to the environment. The system in fact reduces impurities well below the water solubility limit of the materials removed. This is due to the fact that all particles larger than the size of pores 55 in ultrafiltration membrane 54 are removed from the water whether they are suspended or in solution. Common heavy metal ions and other contaminants that may be present in wastewater produced by the metal plating and finishing industry and which may be removed by the invention, along with tentative permissible limits for concentration of these materials when they are discharged to the environment, are listed below:

|  | Effluent Parameter, mg/liter |
|---|---|
| phosphorus | 0.6 |
| aluminum | 0.2 |
| antimony | 0.3 |
| arsenic | 0.05 |
| barium | 1.0 |
| beryllium | 0.3 |
| boron | 0.3 |
| cadmium | 0.1 |
| chromium Cr +6 | 0.05 |
| Cr +3 | 0.2 |
| Cr Total | 0.25 |
| cobalt | 0.3 |
| copper | 0.2 |
| iron | 0.5 |
| lead | 0.5 |
| manganese | 1.0 |
| nickel | 1.0 |
| silver | 0.05 |
| selenium | 0.3 |
| tin | 0.3 |
| zinc | 0.5 |
| gold | 0.3 |
| ammonia | 1.0 |
| mercury | 0.2 |
| cyanide Dest. by $Cl_2$ | 0.03 |
| Refract. | 0.5 |
| Total | 0.53 |
| fluoride | 20 |

The term "heavy metal ions" as used in the specification and claims includes all of the metals listed above in their pure ionic form and/or bound form as in chromates. The term "contaminants" as used in the specification and claims includes all of the nonmetallic materials listed above. In all cases, heavy metal ions and contaminants as used herein include any unwanted materials in wastewater which are removable by the combining agents of this invention.

Figure 2:
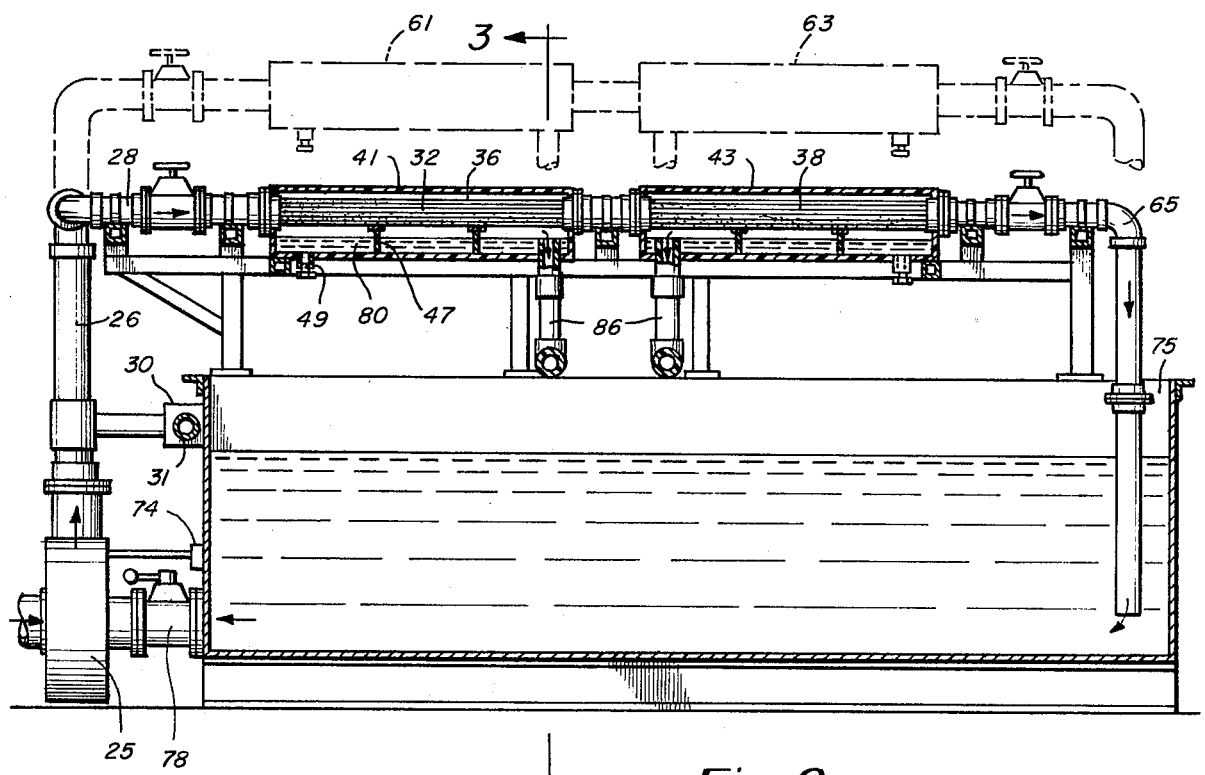
FIG. 2 is a cross-sectional view of the invention taken through line 2—2 of FIG. 1 and suggesting the placement of an additional level of 4 water boxes.

Preferably the invention may also contain wet-down control circuit 74 shown diagrammatically at FIG. 2. This circuit is incorporated to prevent the ultrafiltration membrane from drying out and thus deteriorating when the system is not operating. Normally the system is in continuous operation and the water flowing through the membrane of course maintains it in its wet condition. However when manufacturing operations are closed down, such as on holidays or weekends, or when the plant facilities are being repaired or reconstructed, it may be preferable to shut down the water purification system. Under these conditions a suitable electrically actuated wet-down control circuit 74 automatically activates the system for brief periods at regular intervals.

Figure 6:
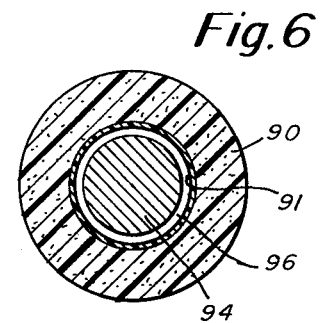
FIG. 6 is a pictorial illustration of an alternative embodiment of a filter tube.

FIG. 6 shows an alternative embodiment of the filter tubes. Filter tube 90 and ultrafiltration membrane 91 are as described above. However, in this alternative embodiment rod 94 extends axially in the center of each tube 90 for the length of the tube. The wastewater passes through annulus or annular gap 96 between the outer circumference of rod 94 and the inner circumference of membrane 91. Rod 94 essentially blocks wastewater from flowing down the center of the tube. In this alternative design of the filter tube the effective filtration area is the same as in the conventional design discussed earlier. However in the conventional design a much larger volume of water must be moved than in the alternative design, and thus a much larger pumping system is required for the conventional system. That is, the column of water which rod 94 blocks out of the tube is not necessary in the filtration process and thus the energy required to move it through the tube is wasted. The rod causes high velocity of flow in a given system and maximizes exposure of the wastewater to the membrane. The rod also reduces the polarization effect (discussed above) in the filter tube and thus actually increases the effective filtration area of the tube. Thus the rod results in higher water filtration capacity in any given system while at the same time it reduces the operating costs of the system.

A feature of the invention is the fact that it may be operated at relatively low pressures. The prior art dictated that one had to choose between relatively low flux through the ultrafiltration membrane or a very high pressure system, especially if a gelatinous precipitate was being filtered. If the low flux rate system were chosen then an extremely large system was required having several times the membrane area of a system according to the invention having an equivalent total water purification capacity. The capital outlay for such a system would be correspondingly large. If the high pressure system was selected, large and expensive pumping systems were required. Further the high pressure system required much higher tolerances throughout the system; every valve and flange had to fit tighter and be stronger. Moreoer, high pressure tends to compress sponge 53 in the ultrafiltration membrane which increases the incidents of membrane blockage and substantially reduces membrane life.

The preferred embodiment of the invention is constructed to operate at between 9 and 150 psig but higher pressures are possible. Up to a given point the water flux through the membrane per unit area of membrane increases with increasing pressure. However, higher pressures also produce the disadvantages of larger capital expenses and shorter life of the ultrafiltration membrane. The preferred pressure represents a suitable compromise between these factors. The minimum pressure 9 psig is determined by the minimum pressure required to force the water through the ultrafiltration membrane. For maximum efficiency of the system, however, the minimum pressure at the exit of pump 25 will be somewhat higher than 9 psig because there is a pressure drop through the conduits and filter tubes. Twelve feet of filter tube creates a pressure drop of approximately 4 psig. Assuming filter tubes of length 6 feet in the preferred embodiments, the total drop across 2 lengths of filter tube would be 4 lbs. and an inlet pressure of approximately 13 lbs. would be required to insure full use of the total length of filter. Such low pressures enable the system to be built with relatively large tolerances and thus minimize design, engineering, and production costs permitting the construction of the system at a price level that makes a high quality water purification system commercially feasible for many new applications. Furthermore the low pressure increases the reliability and operating lifetime of the system.

In the alternative embodiment of the filter tube shown in FIG. 6 the additional surface in the flow stream (the rod surface) and the narrower stream increases the pressure drop across the tube length. Thus the minimum pressure at the exit of the pump becomes approximately 15 to 25 psig (assuming a tube length of 10 to 15 feet and a tube diameter of 1 inch). The increased energy to produce the higher pump pressure however is more than made up by the decreased energy requirements due to greatly decreased pumping volume.

Another feature of the invention is that large diameter and length of filter tubes are permitted. In the preferred embodiment the diameter of the tube is approximately ½ to 2 inches and preferably 1 inch and the length is from 4 to 8 feet and preferably 6 feet. As the diameter of the tubes become larger the "wasted" water carried along the volume of the tube not immediately adjacent to the filtration membrane becomes excessively large, and as the tubes become longer the pressure drop across the tube becomes significant and thus the efficiency and the long life of the system is reduced. The relatively large diameter and length of the filter tubes permitted by this invention enables much large surface areas of filtration membranes to be achieved with a smaller number of tubes. This significantly decreases the capital cost for the system according to the invention as compared with previous systems.

Another important feature of the invention is the grouping of the filter tubes into tube bundles and the enclosure of each of the tube bundles in individual water boxes. The segregation of the filter tubes into separate tube bundles permits the continued operation of the system when one or some of the tubes fail and must be isolated from the system until they are repaired or replaced. The enclosure of the tubes in water boxes results in the fact that if a tube or tubes in one bundle fails only the water in the immediate box is contaminated. This in turn leads to several advantages: first one can quickly determine which tube bundle contains the failed tube and quickly isolate this bundle; second usually only a relatively small portion of the water must be repurified; third, one does not have to shut down the whole row of tube bundles if only one tube bundle fails in the row—instead one merely allows the water box enclosing the tube bundle to drain directly back into the recirculation tank while the others operate as usual. For example, if a tube in bundle 36 failed, water box 41 would be allowed to drain into recirculation tank 75 by opening stop cock 49 and all the other tube bundles including bundle 38 would continue to operate. Thus in the system shown if one tube bundle failed the system may be run at 75% of capacity until a replacement bundle arrives ard then it can be run at 50% capacity while the bundle is being replaced. Generally this permits the manufacturing process which is creating the wastewater to continue at full capacity, because even if the waste volume being produced is close to 100% of the capacity of the purification system, shut-down of part of the system for a brief period only means that the general level of the particle concentrate in recirculation tank 75 will slowly rise until the full system is back in service. Thus a user may operate the system almost indefinitely without ever facing the choice between shutting down manufacturing operations or breaking the law by emission of excess concentrations of waste.

Figure 3:
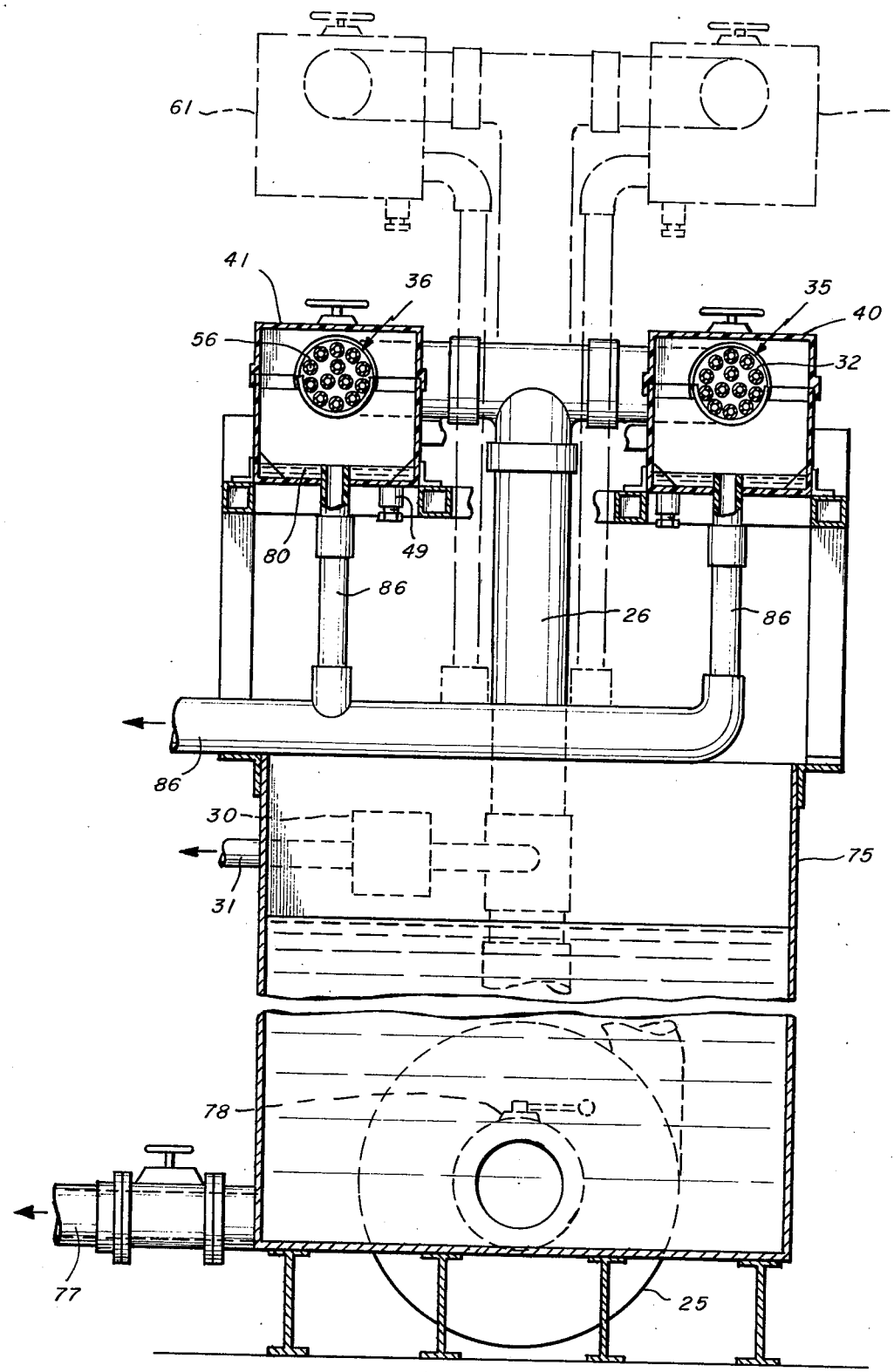
FIG. 3 is a cross-sectional view of the invention taken through line 3—3 of FIG. 2.

In the embodiment of the invention shown there are 13 filter tubes per tube bundle and there are 4 tube bundles and water boxes. Neither of these numbers is essential to the invention. The smaller the number of tubes in a bundle the greater is the number of bundles and water boxes required for a system of a given purifying capacity, and thus the greater is the capital cost of the system. The larger the number of tubes in each bundle the shorter will be the average time that the tube bundle will be in service until a tube fails. Any reasonable balance between these alternatives may be chosen. Given a certain number of filter tubes per tube bundle the number of bundles and water boxes an embodiment of the invention will have is determined by the desired capacity of the system. In FIGS. 2 and 3 a second tier of 4 water boxes 60, 61, 62, 63 containing tube bundles are sketched in phantom showing the configuration of the system having twice the capacity of the embodiment shown in FIG. 1. Similarly additional water boxes may be added to each row, or additional rows or additional tiers may be added as larger capacity systems are desired. In some embodiments of the system the boxes in each tier are not positioned directly above the boxes in the lower tier but are offset in one or both of the horizontal positions so that direct drainage into recirculation tank 75 is facilitated for boxes on each tier. Preferably the overall length from the start of one tube to the end of that tube or another tube in a row is maintained at no more than about 18 feet so that when the maximum fluid pressure is no higher than 25 psi on the membrane at the start, it is no less than about 8 psi at the end.

Another feature of the invention is that the chemistry and mechanics for disposal of and/or for recovery of valuable materials from the sludge is simplified and improved in many respects. For example, the preferred combining agent combines with monovalent copper which then can be recovered by precipitation; the combining agent and the copper may then be separated and recovered from the precipitate by relatively simple combinations of pH changes plus filtering. Previous methods for removing and recovering monovalent copper involved sequestering the copper with ammonia, EDTA, urea or other complexes followed by heating or even smelting. Similarly in the invention chrome may be recovered by precipitation followed by the addition of an oxidizing agent such as sodium hypochlorite or hydrogen peroxide and then refiltering the result through the water purification system, whereupon the chrome goes off in the filtered water and the iron returns to the recirculation tank where it can be reused.

Further because of the crystalline rather than gelatinous nature of the precipitate, conventional filtering and drying procedures, used when it is desirable to dispose of a sludge as a dried solid, are faster and more efficient with the sludge produced by the invention.

There has been described a novel water purification system characterized by high purified water flux rates at relatively low pressures and having many other features. It is evident that those skilled in the art may now make numerous uses and modifications of and departures from the specific embodiment described herein without departing from the inventive concepts. For example the invention may be used in many applications in addition to purifying the wastewater from metal plating and finishing operations; in fact it may be used wherever it is desirable to remove impurities from water that will combine with a combining agent to form particles larger than 10 angstroms. Further most adjustments of the system that are performed with manual valving arrangements in the preferred embodiment may be performed with sensors and motorized valves. Further the filter tubes may take on a variety of shapes such as spirals, or may be formed as plates or in numerous other forms. The water boxes may by cylindrical, may be open troughs or may take on a wide variety of other shapes or forms. Likewise other elements of the system such as the conduits and recirculation tanks may take on a variety of shapes, combinations, and relationships to one another, and may in some systems be omitted altogether. Consequently the invention is to be construed as embracing each and every novel combination of features present in and/or possessed by the apparatus herein disclosed.

What is claimed is:

1. A water purification system comprising
    a combining agent comprising an inorganic metal hydroxide with the metal being selected from the group consisting essentially of iron, aluminum, tin, copper, zinc, cadmium, nickel, cobalt, silicon, lead, barium, calcium, manganese, and chrome,
    means for combining at least 1700 ppm of said combining agent with wastewater at a pH of from 7.1 to 14 with the molar ratio of said combining agent to the impurities in said wastewater being 1:1 or greater, so that a particle-water blend is formed wherein said impurities are bound with said combining agent in particles of size at least 10 angstroms,
    an ultrafiltration unit for separating said particle-water blend into substantially pure water and a concentrate of said particles; said unit comprising a plurality of porous filter tubes lined with skinned ultrafiltration membranes and having a length of at least 3 feet and a diameter of at least ½ inch, so that if said particle-water blend is incident upon said membranes under a pressure of 9 psig or higher there is a flux of purified water through said membranes of at least 30 gfd,
    means for transferring said particle-water blend from said means for combining to said ultrafiltration unit,
    means for withdrawing said concentrate of particles from said system,
    means for disposal of said purified water,
    said ultrafiltration unit comprising a plurality of tube bundles each including at least one of said filter tubes and each enclosed in its own water box for collecting said purified water,
    said means for transferring and the diameter of each filter tube being adapted so that the fluid flow adjacent to said membrane is turbulent,
    and means for blocking fluid from flowing through the central portion of each filter tube so that the flow of said particle-water blend is confined to the annular region immediately adjacent to the inner circumference of said tube.

2. A water purification system in accordance with claim 1 wherein said means for blocking comprises a rod centered on the axis of said filter tube and extending along the length of the tube.

3. A method of purifying water comprising, combining at least 1700 ppm of a combining agent with wastewater at a pH of from 7.1 to 14 with the molar ratio of said combining agent to the impurities in said wastewater being 1:1 or greater so that a particle-water blend is formed wherein said impurities are bound with said combining agent in particles of size at least 10 angstroms; said combining agent comprising an inorganic metal hydroxide with the metal being selected from the group consisting essentially of iron, aluminum, tin, copper, zinc, cadmium, nickel, cobalt, silicon, lead, barium, calcium, manganese, and chrome, and subsequently filtering said particle-water blend by passing said particle water blend to a plurality of parallel conduits each containing a plurality of series arranged ultrafiltration units whereby a portion of said water from said water particle blend is withdrawn through said ultrafiltration units with a slurry being passed to a recirculation tank for recirculation through said ultrafiltration units, each of said ultrafiltration units comprising a plurality of filter tubes each having an inner surface covered by an ultrafiltration membrane, and means for selectively directing flow through the membranes of one or more of said ultrafiltration units directly to said recirculation tank while permitting withdrawal of purified water from other of said ultrafiltration units.

4. A method of purifying water in accordance with claim 3 and further comprising operating said method at timed intervals to assure prevention of drying out of said at least one porous filter tube membrane.

5. A water purification system for removing contaminants from wastewater, said purification system comprising, a recirculation tank, a conduiting circuit having a parallel branch arrangment of ultrafiltration units each unit containing a plurality of substantially parallel ultrafiltration tubes each having a skinned membrane, each unit comprising an elongated housing box surrounding said plurality of filtration tubes, and a plurality of units within each parallel portion of said conduiting circuit, a recirculation pump, conduit means leading from said recirculation tank to said pump, from said pump to a manifold arrangement for passing wastewater to each said parallel branch of ultrafiltration units and for recovering the slurry therefrom and passing it to said recirculation tank, with each of said elongated housing box surrounding each ultrafiltration unit being interconnected with conduiting means for carrying off filtered water, means for interconnecting at least one of said ultrafiltration housing boxes with a valve means for isolating water passing through a filter membrane of said one housing box, from said conduiting means for carrying off filtered water, so that upon failure of a membrane in said at least one ultrafiltration housing, the slurry passing through said last-mentioned membrane can be returned to said recirculation tank and recirculated in said system with filtering being continuously carried out and without the need for shutdown of the entire system.

6. A system in accordance with claim 5 and further comprising timing means for electrically automatically operating said pump to wet said ultrafiltration units at timed intervals when said system is not otherwise operating and thereby maintain filter membranes of said ultrafiltration units in a constantly wet condition.

7. A water purification system in accordance with claim 5 and further comprising said conduiting means and ultrafiltration units being sized to provide turbulent flow of fluid within said ultrafiltration units, said plurality of filtration tubes of each unit being bound to a support means removably mounted in the housing box of each unit.

8. A water purification system in accordance with claim 7 wherein fluid flow is maintained at said membranes at a pressure of from 9 to 150 psig to maintain a flux of purified water through said membranes of said ultrafiltration units of at least 30 gfd.

9. A water purification system in accordance with claim 7 wherein said ultrafiltration units comprise at least two porous filter tubes lined with a skinned ultrafiltration membrane having a length of at least 6 inches and an internal diameter of at least 100 mils.

10. A water purification system in accordance with claim 9 wherein said ultrafiltration tubes have a length of from four to eight feet.

11. A water purification system in accordance with claim 5 wherein means are provided within each filter tube extending along the length of each tube to confine the water particle blend flowing therethrough to an annular region immediately adjacent the inner surfaces of said tubes.

* * * * *

UNITED STATES PATENT AND TRADEMARK OFFICE
CERTIFICATE OF CORRECTION

PATENT NO. : 4,276,176
DATED : June 30, 1981
INVENTOR(S) : Jacob Shorr

It is certified that error appears in the above—identified patent and that said Letters Patent is hereby corrected as shown below:

Cover page, fourth line under "Related U. S. Application Data", please change "Feb. 2, 1974" to --Jan. 2, 1974--.

Column 7, line 46, please correct "slidge" to --sludge--.

Column 8, line 34, please change "lead  0.5" to --lead  0.05".

Signed and Sealed this

Seventeenth Day of November 1981

[SEAL]

Attest:

GERALD J. MOSSINGHOFF

Attesting Officer

Commissioner of Patents and Trademarks